(No Model.)

P. HOCKETT.
DOUBLE INTERMITTENT GRIP GEARING.

No. 430,020. Patented June 10, 1890.

Witnesses:
R. P. Nichols
W. D. Rumbert

Inventor:
Pleasant Hockett

UNITED STATES PATENT OFFICE.

PLEASANT HOCKETT, OF COLORADO SPRINGS, COLORADO.

DOUBLE INTERMITTENT GRIP-GEARING.

SPECIFICATION forming part of Letters Patent No. 430,020, dated June 10, 1890.

Application filed September 28, 1889. Serial No. 325,349. (No model.)

*To all whom it may concern:*

Be it known that I, PLEASANT HOCKETT, a citizen of the United States, residing at Colorado Springs, in the county of El Paso and State of Colorado, have invented certain new and useful Improvements in Double Intermittent Grip-Gearing; and I do hereby declare the following to be a full, clear, and exact description of the invention, such as will enable others skilled in the art to which it appertains to make and use the same.

The object of my invention is to provide a noiseless, continuous, simple, and effective friction-gear, such as is hereinafter described and claimed.

Figure 1:
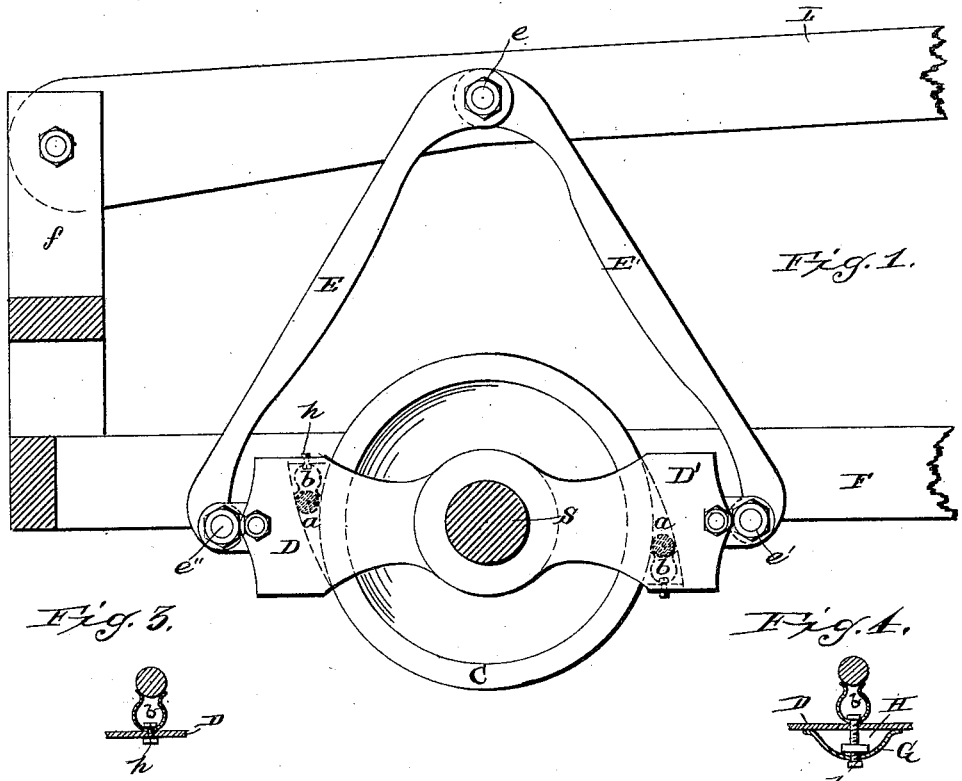
Figures 3, 4:
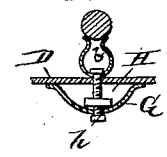
Figure 2:
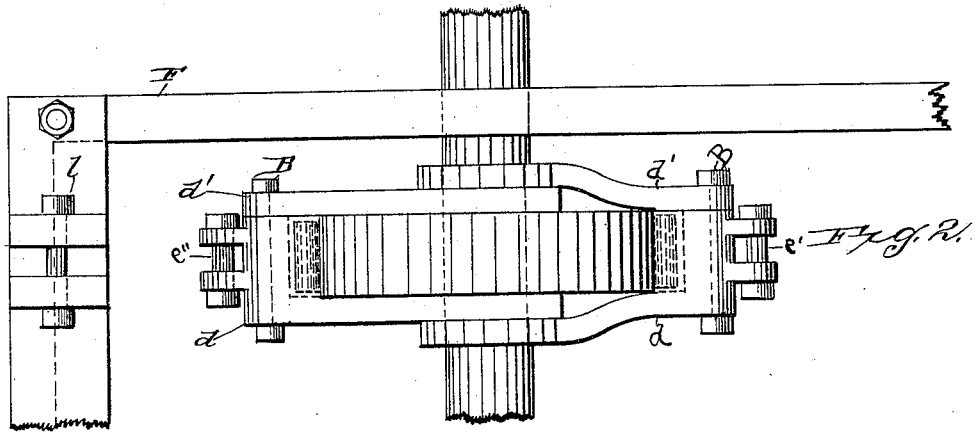

In the drawings, Figure 1 shows a side view and partial section of the gear. Fig. 2 is a plan view of the same, the lever L and links E E' being removed. Fig. 3 is a detail view of the spring supporting the roller, and Fig. 4 is a modification of the same.

In the drawings like reference-letters refer to like parts throughout.

F is the frame in which the gear is set, and it may of course be the frame of a car which has to be driven by the rotation of wheels driven by the gear, or it may be the framework of a machine in which driven wheels and pulleys are journaled.

S is a shaft journaled in said frame and having the driven wheel C keyed or shrunk upon the same, so that the revolution of the wheel will cause the revolution of the shaft. The wheel C is preferably made of steel or of iron, having a chilled periphery ground to the greatest possible smoothness in order to enable my invention to work in the most efficient manner. Pivoted upon the shaft S or upon the bearings concentric therewith are one or more pawl-levers D D', in each of which said pawl-levers is a cavity whose inner wall is preferably formed upon a curve of nearly the same radius as that of the driven wheel C or possibly on a slightly greater radius, which curve is slightly eccentric to the periphery of the wheel C. In this way the wall of said cavity and the face of the wheel approach each other, forming a spherical angle. In each of these cavities I place a small hardened roller $a$, preferably of steel, which is supported by a suitable spring $b$, which tends to force it toward the vertex of the aforesaid spherical angle.

I have illustrated in the drawings a preferable form of such spring, which is U-shaped, and whether formed in this shape or in any other it should support the roller $a$ without in any way interfering with the partial revolution of said roller when it is caught between the oppositely-moving faces of the periphery of the driven wheel C and the cavity in the pawl-lever D.

The spring $b$ is fastened in the cavity by means of the bolt $h$ passing through a portion of the pawl-lever, as clearly shown in Fig. 3. It may sometimes be desirable to render such spring adjustable, which may be done in a number of ways, one of which I have illustrated in Fig. 4, where the bolt $h$, upon which the spring $b$ is mounted, has a threaded extension, upon which is mounted the nut H. This nut H is seated upon any suitable bearing, such as that afforded by the bridge-piece G, as shown. The bolt $h$ thus having a certain amount of vertical play can be adjusted by turning the nut H, and will thus raise or lower the spring $b$ and the roller $a$ resting thereon.

The pawl-levers, as clearly shown in Fig. 2, are each formed in two pieces $d$ $d'$, held together by bolts B. Mounted in and pivoted to the uprights $f$, by means of the bolt $l$, is a lever L. Links E E' connect said operating-lever with the pawl-levers D D', being pivoted thereto by the pins $e$ $e'$ $e''$, as shown.

The method of operation of my invention is evident. The vibration of either of the pawl-levers D D' will cause a roller $a$ to roll up toward the vertex of the angle formed between the inner wall of the cavity and the periphery of the wheel C, and thereby lock a pawl-lever to the wheel during its vibration in one direction. When the pawl-lever vibrates in the other direction, roller $a$ will roll out into the broader part of the cavity, resting upon the spring $b$, and will present no obstruction to the slipping of the pawl-lever over the wheel. If it is desired to obtain greater force, the pawl-lever D is connected by the link E to the operating-lever L, which will multiply the force applied according to the well-known law of the lever. The operation of that portion of my invention which renders the action of the grip-gearing continuous is as follows: In the preferred form of my invention, two pawl-levers D D′, upon opposite sides of the driven-wheel C, are employed. Each of these is the duplicate of the other, and consequently when they are arranged upon opposite sides the vertices of the angle formed by the inner walls of their respective cavities and the periphery of the driven wheel C will point in opposite directions. Each of these pawl-levers is connected by links E E′ to the operating-lever L, and consequently upon the downstroke of the lever L the pawl-lever D′ will be locked to the driven wheel C, and upon the upstroke of the said lever L the pawl-lever D′ will be similarly locked while the pawl-lever D is running free. In this manner the revolution of the driven wheel C is rendered positive and continuous.

Having therefore described my invention, what I claim as new, and desire to protect by Letters Patent, is—

1. In a double intermittent grip-gearing, the combination of the driven wheel, the two pawl-levers pivoted upon an axis concentric with that of the wheel upon opposite sides of said wheel, each of which said pawl-levers has a cavity whose inner wall is formed on a curve slightly eccentric to the curve of the wheel periphery, the hardened roller confined between the inner wall of each of said cavities and the periphery of the wheel, and the spring which tends to force the roller toward the vertex of the angle formed by the wall of each of the aforesaid cavities and the face of the wheel, the vertices of said angles pointing in opposite directions, the frame in which the wheel is journaled, the operating-lever pivoted on the frame, and the links which connect each of the two pawl-levers to the operating-lever, substantially as described.

2. In a double intermittent grip-gearing, the combination of the driven wheel, the two pawl-levers pivoted on an axis concentric with that of the wheel upon opposite sides of said wheel operating independent one of the other, each of which pawl-levers has a cavity whose inner wall is formed on a curve slightly eccentric to the curve of the wheel periphery, a hardened steel roller confined between the inner wall of each of said cavities and the periphery of the wheel, and the U-shaped spring which is seated in the cavity and supports said roller, permitting the same to revolve and tending to force it into the vertex of the angle formed by the wall of the aforesaid cavity and the face of the wheel, the vertices of two angles pointing in opposite directions, the frame in which the wheel is journaled, the operating-lever pivoted on the frame, and the links which connect each of the two pawl-levers with the operating-lever, substantially as described.

In testimony whereof I affix my signature in presence of two witnesses.

PLEASANT HOCKETT.

Witnesses:
    HENRY WILTON,
    CLIFTON B. HOLBERT.